United States Patent [19]

Berni

[11] 4,240,775
[45] Dec. 23, 1980

[54] IMPLEMENTATION FOR APPLYING A LINING TO THE INNER WALL OF A TUBULAR ARTICLE

[76] Inventor: Alberto Berni, Via Stoppani 15, Bergamo, Italy

[21] Appl. No.: 908,652

[22] Filed: May 23, 1978

[30] Foreign Application Priority Data

Jun. 2, 1977 [IT] Italy ............................ 24315 A/77
Aug. 5, 1977 [IT] Italy ............................ 26558 A/77

[51] Int. Cl.³ .................. B29C 1/12; B29C 27/16; B28B 21/20; B28B 21/80
[52] U.S. Cl. ............................. 425/110; 425/468
[58] Field of Search ............ 425/110, 468; 249/65, 249/90, 91, 180, 183; 264/314, 311, 269, 270

[56] References Cited

U.S. PATENT DOCUMENTS

| 719,679 | 2/1903 | Lyman | 249/18 D |
|---|---|---|---|
| 1,122,977 | 12/1914 | Mooney | 249/183 |
| 1,964,386 | 6/1934 | Nose | 249/65 |
| 2,579,423 | 12/1951 | Ford | 249/65 |
| 3,258,384 | 6/1966 | Scott | 264/314 |
| 3,482,007 | 12/1969 | Routh | 264/269 |
| 3,585,695 | 6/1971 | Penny et al. | 425/110 |
| 4,060,218 | 11/1977 | Nayagam | 249/183 |

FOREIGN PATENT DOCUMENTS 1189949 10/1959 France ........................... 249/180

*Primary Examiner*—James B. Lowe
*Attorney, Agent, or Firm*—Stevens, Davis, Miller & Mosher

[57] ABSTRACT

A machine is disclosed for applying an inner lining to a tubular article. The machine is introduced in the interior of the tubular article, centered herein and has the configuration of an inner expansible core. Sealing rings are then applied to close the ends of the annular gap so provided and the inner coating material cast in the gap while air is concurrently discharged. An improved centering mechanism for such machine is also described. Core expansion can be obtained both pneumatically and mechanically.

10 Claims, 19 Drawing Figures

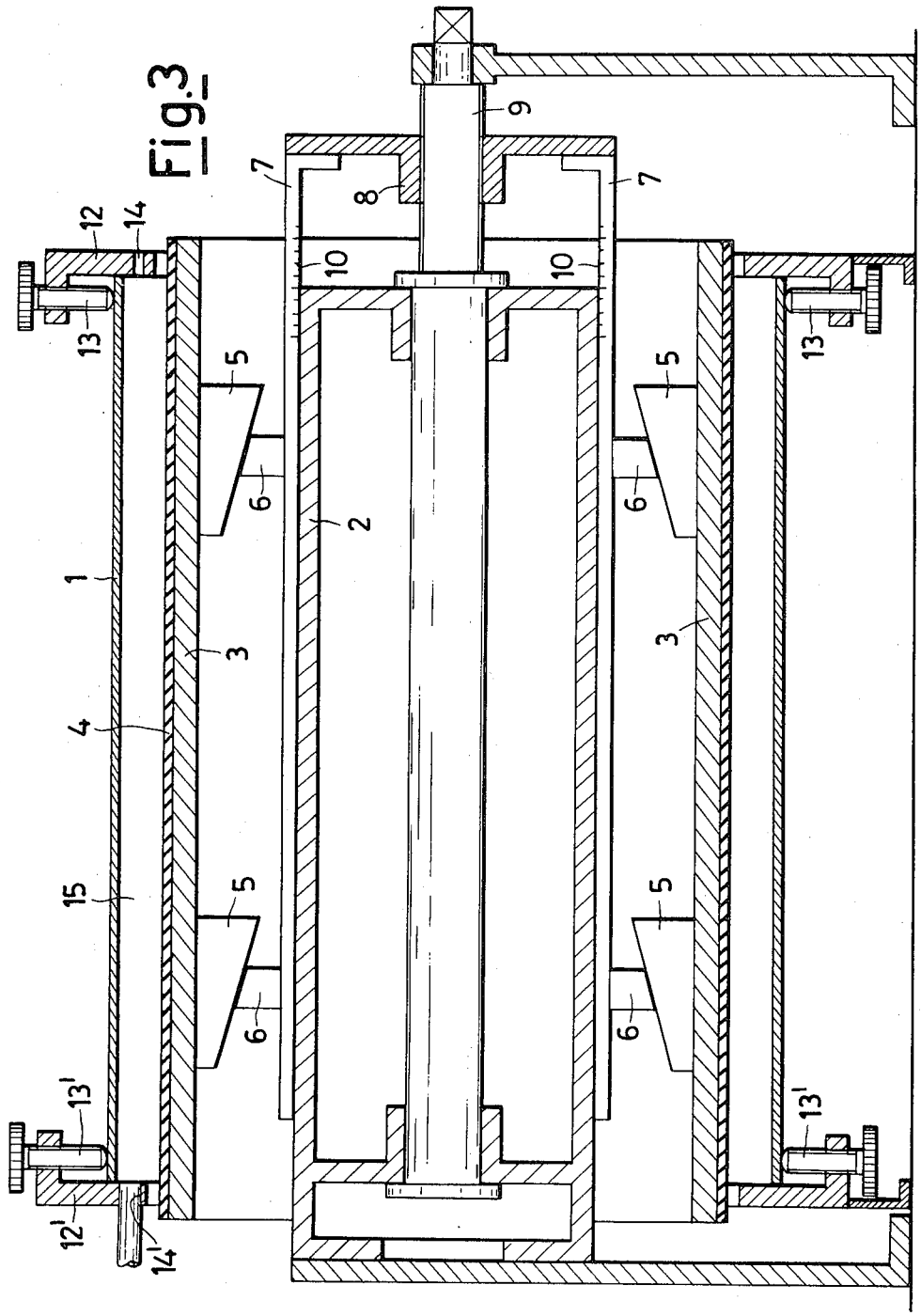

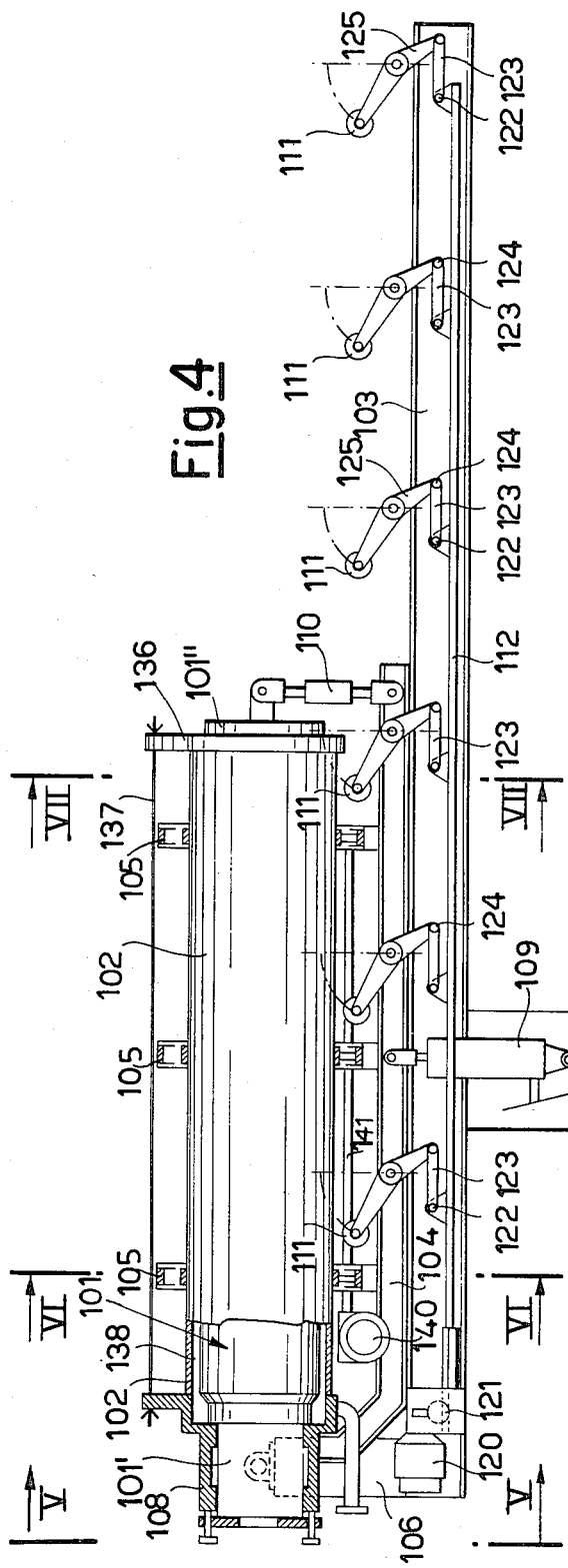

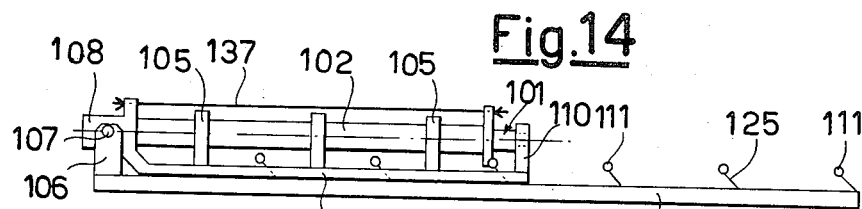
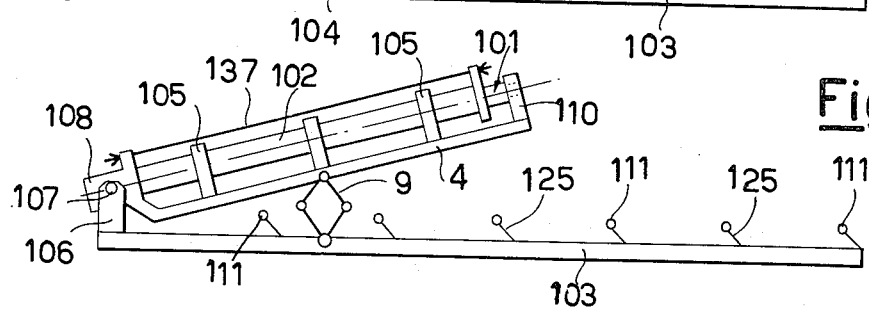
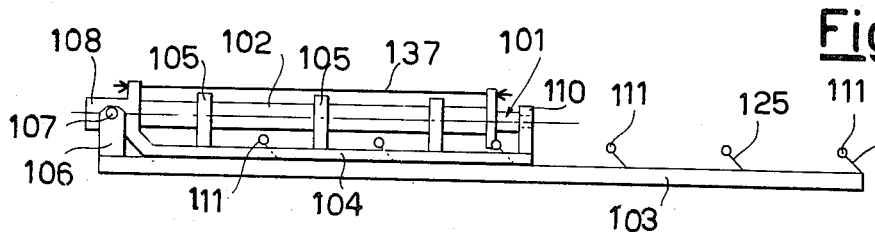
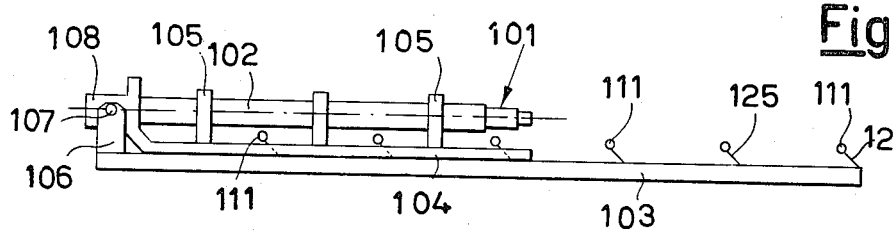
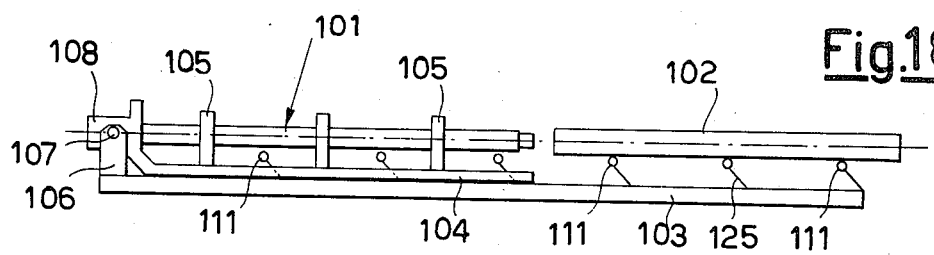
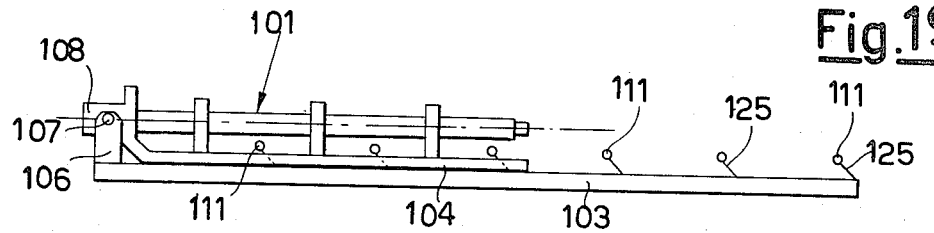

IMPLEMENTATION FOR APPLYING A LINING TO THE INNER WALL OF A TUBULAR ARTICLE

This invention is concerned with an implementation for applying an inner lining of a material in a plastic or fluid state to the inner surface of a tubular article.

The subject invention has the purpose of permitting the application in a quick, cheap and efficient manner, of a lining of any material which is in the plastic or fluid condition, to the inner surface of any tubular article whatsoever, without resorting to the conventional procedures of spreading, laminating or centrifugalizing. A perfectly smooth and regular finished surface is thus obtained.

The invention permits, at the same time, to select within a wide range the thickness of the lining to be provided, even taking into account the usual tolerances in the construction of the tubular articles in general.

In the first place, the method of application of the lining is based not on spreading, laminating or centrifugalizing procedures but, on the provision of an annular gap, having a preselected variable wall thickness, in the interior of the tubular article to be lined. This gap will then be filled with the lining material and the latter will take, once it has set, the exact size and shape of the gap.

Assuming then, by way of example, without limitation, that the case is that of a tubular article having a circular cross-section and made of steel, either seamless or obtained by welding a metal sheet anyhow, it is known that the deviations from the nominal values of its diameter as allowed in practice, are in the range of a few percentage units relative to the nominal values. This must be assumed to take into account the usual allowances which are inherent in the methods of production of such tubular articles.

Once a certain nominal diameter of a steel tube to be lined internally has been selected, and the thickness of the inner liner as also been established beforehand, it would then be impossible to provide the gap which is necessary in order that the lining might economically be provided by casting the material, if such a gap should not be such as to match the actual diameter of the tube. Likewise, should one desire to vary the thickness of the coating for equal tube diameters, it would not be possible to provide the necessary gap in an economically acceptable way if an implementation would not be available which is capable of consequently varying its diameter.

The present invention prevents wasting the material, while obviating the shortcomings enumerated above, in that it permits that a uniformly variable thickness gap be provided, the variation lying within a range which is wide enough to cover the constructional allowances of the tubular products while avoiding the necessity of modifying the wall thickness of the lining.

The invention is concerned with an implementation to be located in the interior of the tubular product to which an inside lining is to be applied, such implementation having a periphery of a uniformly variable length, the length being preselected according to the individual requirements.

More detailedly, according to the present invention, an implementation has been provided for applying a lining to the inner wall of a tubular article, the implementation being characterized in that it comprises, in combination, a resilient jacket or hood in the interior of which expansible means are provided, and supporting and adjusting means which are capable of supporting in an adjustable manner the tubular article externally of the jacket and coaxially therewith.

Another object of the invention is to provide a machine which is capable of ensuring, in coaction with the variable-periphery implementation referred to above, the exact coaxial relationship between said implementation and the tubular article to be internally lined irrespective of the variations of the cross-sectional size variations of such tubular article, while simultaneously permitting that a semi-automatic performance of the operations to be performed might be obtained together with the exploitation of the machine for a wide range of cross-sectional sizes of the tubular article to be internally lined.

Having these objects in view, it has been envisaged, according to the present invention, to provide a self-centering machine for the application, on an industrial scale, of a lining to the inner wall of a tubular article, the machine being cheracterized in that it comprises, in combination: a fixed baseplate equipped with a roller assembly which can be adjustable as to its level, a bench mounted oscillably on the baseplate and carrying, in correspondence with its swing axis, a centering head capable of receiving a variable-diameter tubular implementation and, along the axis, a plurality of self-centering supporting members for the tube to be lined, adjusting means acting between the swinging bench and said implementation and adapted to have the longitudinal symmetry axis of the implementation with the axis of the self-centering supporting members, actuating means being provided to adjust the level of the roller assembly and to control the swing of the bench as well as the entering into action of the self-centering supporting members.

The operation of the machine is of the static type in that the lining material is applied to the tubular article by casting, without having any component part of the machine or the tubular article in motion. The mechanisms of the machine, in fact, are merely intended to afford a quick and correct positioning both of the tubular article to be lined and of the conventional variable-periphery implementation.

The structural and functional features of the invention and its advantages over the prior art will become clearer from a scrutiny of the ensuing exemplary description referred to the accompanying drawings, wherein:

FIG. 3 is a view similar to that of FIG. 1, but shows the implementation in its inoperative condition;

FIG. 4 is a side elevational view, partly in cross-section, showing a self-centering machine made according to this invention;

FIG. 5 is a cross-sectional view taken along the line V—V of FIG. 4;

FIG. 6 is a cross-sectional view taken along the line VI—VI of FIG. 4;

FIG. 7 is a cross-sectional view taken along the line VII—VII of FIG. 4, and

FIGS. from 8 to 19 inclusive are diagrammatical views which illustrate the sequential order of the several operational stages of the machine according to this invention.

Figure 1:
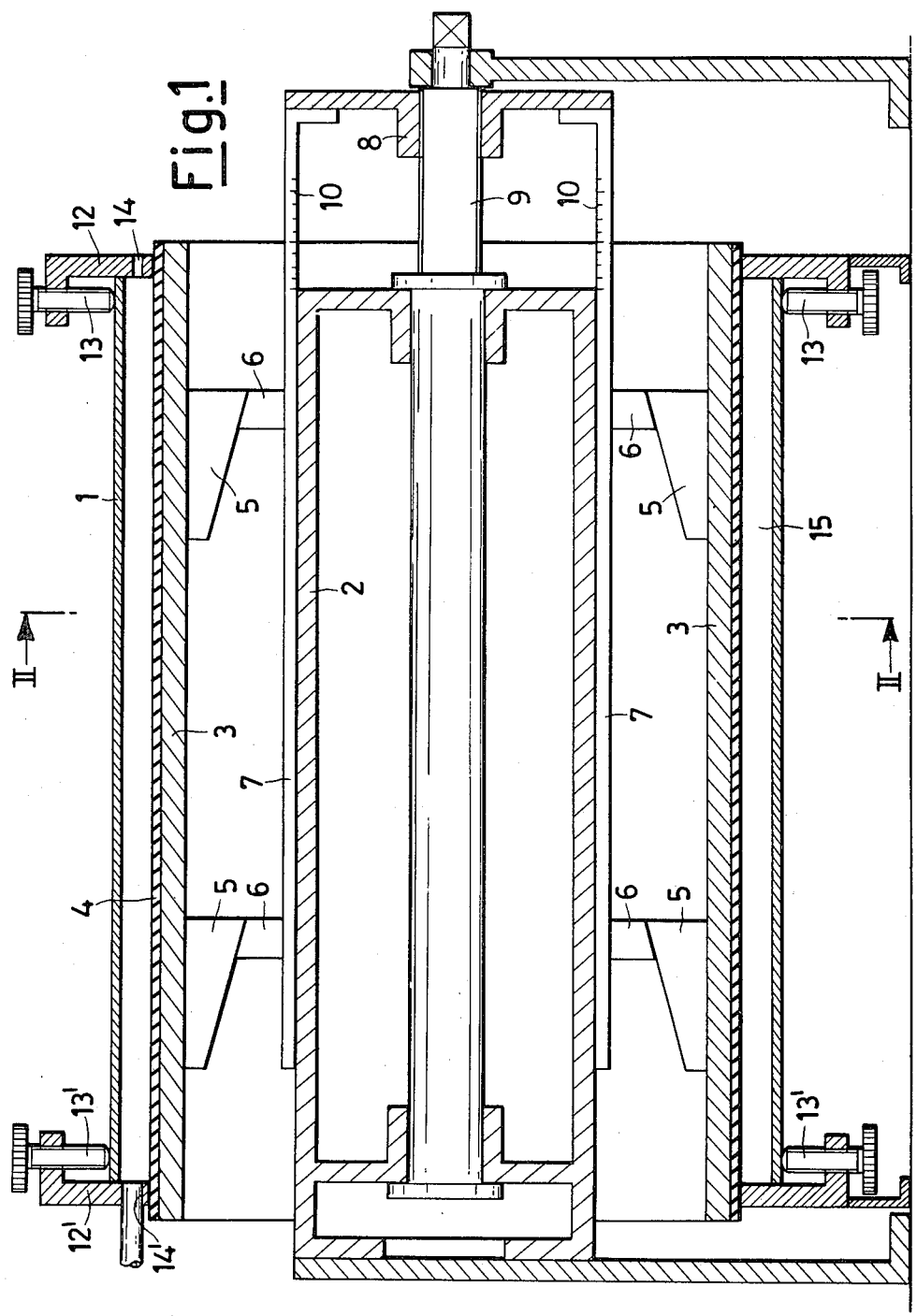
FIG. 1 is a longitudinal cross-sectional view showing a possible embodiment of the invention in its operational condition.
Figure 2:
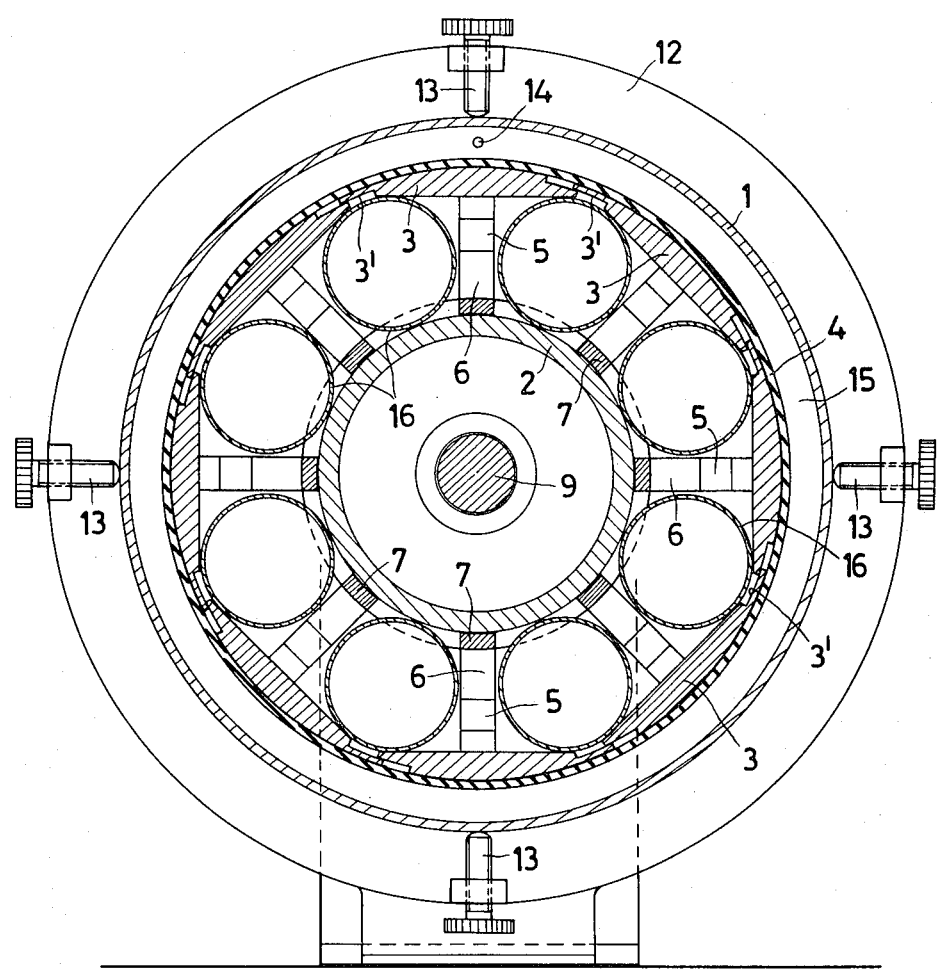
FIG. 2 is a cross-sectional view, taken along the line II—II of FIG. 1.

Having now reference, at the outset, to FIGS. 1 to 3 of the accompanying drawings and indicating at 1 the tubular article to be lined internally, the implementation essentially comprises a central spindle 2, which carries on its outer periphery an adequate number of shaped sectors 3 which are held stuck to the central spindle by means of an expansible sheath or jacket 4, intended to make up with the tubular article an annular gap 15.

The shaped sectors 3 are equipped with expansion means which take the form of inclined planes 5 or the like, the latter planes being biased by pushers 6 fastened to guide members 7 which slide on the spindle 2. The guide members 7 are gauged together and connected with a manipulation means which can control the displacement of said guides unidirectionally. In the drawings is shown, by way of indication and without limitation, a screw control device 9 coaxial with the spindle 2, the nut member 8 being also shown. A graduated scale 10 permits to index the position of the sliding guide members 7 and thus the corresponding diameter taken by the expansible sheath 4 under the urge of the sectors 3, these being pushed by the pushers 6 which act on the wedges 5.

The implementation is completed by sealing rings 12 and 12' applied to the ends of the tubular article 1 and which are capable of sealing the annular gap 15 provided between the expansible sheath 4 and the inner surface of the tubular article to be lined. The sealing rings 12 and 12' are centered both relative to the tubular article 1 to be lined internally and to the expansible sheath 4, so as to ensure the dimensional evenness of the lining to be provided. Centering can be achieved by adjustment screws 13 and 13' or with any other appropriate mechanisms.

The sealing ring 12' has, in addition, one or more orifices 14' for introducing in the gap 15 the material intended to make up the inner lining of the tubular article 1. The other sealing ring 12, conversely, has one or more bores 14 to vent air from the gap 15 as the lining material is being cast thereinto.

In order that the forces which are required for moving the slidable guide members 7 and for causing the de-formation of the expansible sheath 4, provision can be made of elastic air bags 16 (FIG. 2) which are extended along the entire length of spindle 2 and are subjected to an internal air pressure and, by being expanded, cause the shaped sectors 3 to be lifted and thus the free displacement of the guide members 7. In order that the air bags 16 may evenly be deformed, these bags are connected to each other at either end so as practically to compose a single chamber which is reliably subjected to a uniform pressure.

In order to reduce the wear of the wedges 5 and the pushers 6, as well as to decrease the magnitude of the forces which are necessary to deform the elastic sheath 4, the pushers 6 can be embodied fitted with rolling bearings, and this in combination, or not, with the air bags 16.

In order that the wide variations required for the periphery of the implementation may be achieved without originating undesirable deformations on the outer surface of the elastic sheath 4, the shaped sectors 3 are so embodied that their outermost portions 3' are interlocked with those of the adjoining sectors or overlap same, as clearly shown in FIG. 2, in a slidable manner.

The operation of the implementation constructed according to the present invention is apparent from that which has been disclosed hereinabove with reference to the FIGURES of the accompanying drawings and, briefly stated, is as follows:

The tube 1, which must be lined internally, is mounted on the implementation coaxially with the spindle 2.

The expansible sheath 4 is then dilated, to bring it from the configuration of FIG. 3 to that of FIG. 1, by the combined action of the pushers 6 on the wedges 5 and that of the air bags 16 between the spindle 2 and the sectors 3, so as to obtain an annular gap 15 having the expected size which corresponds to the thickness of the lining intended to be provided on the inner surface of the tube 1.

The gap 15 is then filled with the material in the fluid or doughy condition, with which it is desired to line the inner surface of the tube 1.

Once the lining material has set, the elastic sheath 4 is restored to its retracted position as shown in FIG. 3 and the tube 1 is removed from the implementation, the latter being thus in readiness for another operational cycle again.

By so doing, an implementation is provided which is comparatively simple and cheap and permits to apply a lining to a tubular article with a thickness which is extremely accurate and controlled, while taking into account the machining tolerance of the tube.

The extremely accurate coaxial relationship between the implementation described in the foregoing and the tubular article to be internally lined is ensured by the machine depicted in FIGS. from 4 to 19 inclusive of the accompanying drawings.

The machine in question is essentially comprised of a fixed bedplate 103 and a swingable cradle 104 which carries an appropriate number of self-centering bearings 105.

The fixed bedplate 103 carries by the agency of the legs 106, the swinging bearings 107 for the head 108 into which the end 101' of the variable periphery implementation 101 is introduced and centered in a stable form.

The swingable cradle 104 is rigidly connected to the head 108 and rests against the fixed bedplate 103 with accurately machined contact surfaces, so that the axis of the self-centering bearings 105 exactly coincides with the axis of the cylindrical head 108. The swingable cradle 104 can be swung about the swinging bearings 107 by the agency of a jack 109 or similar manipulating mechanism so that the cradle can be tilted upwards.

The free end 101" of the variable periphery implementation 101 is rigidly connected to the cradle 104 by means of a linkage 110 which is active between 104 and 101 so as to permit a fine adjustment of the level of said free end 101" thus ensuring the coincidence of the axis of the variable periphery implementation 101 with the axis of the self-centering bearings 105. The linkage 110 can be a telescopable rod with screws and nuts.

A set of rollers 11 permits both the positioning and the withdrawal of the variable periphery implementation 101 as well as those of the tubular article 102. The rollers are synchronously lifted or depressed to bring them into the desired position by a mechanism actuated either by an electric motor or a jack. More detailedly, the mechanism as shown comprises an electric motor 120 which, via a pinion 121, drives a rack 112 to which connecting rods 123 are pivoted at 122, the rods 123, in their turn, are pivoted at 124 to either end of an attendant lever 125. At the opposite end, each lever 125 is fastened to a shaft 126 which can be rotated on tabs 127 of the fixed bedplate 103. To the opposite ends of each shaft 126 are affixed arms 128 which carry the idlers 111 (FIGS. 4 and 7). It is thus apparent that the motion in either direction of the rack 112 causes, via 123, 125, 126 and 128 a clockwise or a counter-clockwise oscillation, respectively, of the couples of rollers 111.

To facilitate the sliding of the variable periphery implementation 101 and the tubular article 102 on the rollers 111, when the bulk and weight of the implementation and the tube are considerable, provision is made of a closed loop cable or chain which is driven in either sense by an electric capstan and can be hooked to the pieces to be displaced.

The self-centering bearings 105 are also simultaneously and synchronously actuated so as to be brought to the desired inside diameter, by a mechanism driven by an electric motor or a jack.

More detailedly, the mechanism shown herein operates very much in the same way as that, well known, of a camera diaphragm. As a matter of fact, each bearing 105, in the example shown, comprises three sectors of a circle each of which is pivoted at 130 to a supporting ring 131 fastened to the swingable cradle 104. The end of each sector away of 130, conversely, is pivoted at 132 to a connecting rod 133, the latter being pivoted, in its turn, at 134, to the ring 139 which is rotatable within the ring 131. Opening and closing the sectors 105 are carried out, for example by a linkage 113 driven by an electric motor 140 via a shaft 141 operatively connected to the linkage 113. It is thus apparent that a counter-clockwise rotation of the lever 135 opens the sectors, whereas the clockwise rotation causes the sectors to clamp the tube 102.

Figure 8:
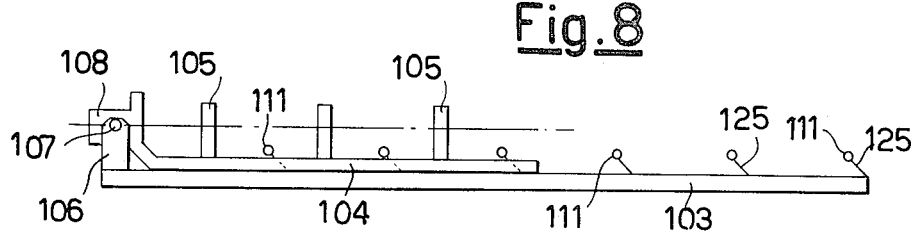

The operational sequence of the machine in question is depicted in FIGS. from 8 to 19 inclusive, in which:

FIG. 8 shows the machine in the inoperative position with the rollers 111 in readiness for receiving the variable periphery implementation 101, the latter to be selected consistently with the cross-sectional size of the tubular article 102 to be lined internally, and the self-centering bearings 105 are open to their maximum diameter.

Figure 9:
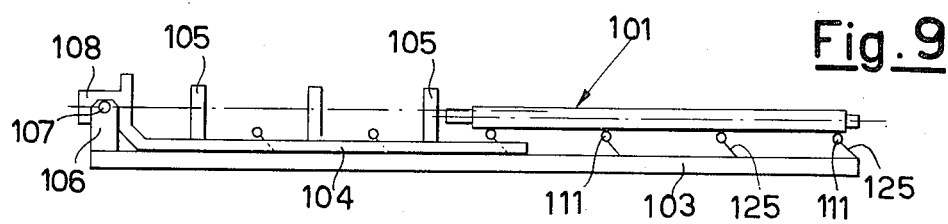

FIG. 9 shows the variable periphery implementations when placed on the roller set, externally of the self-centering bearings.

Figure 10:
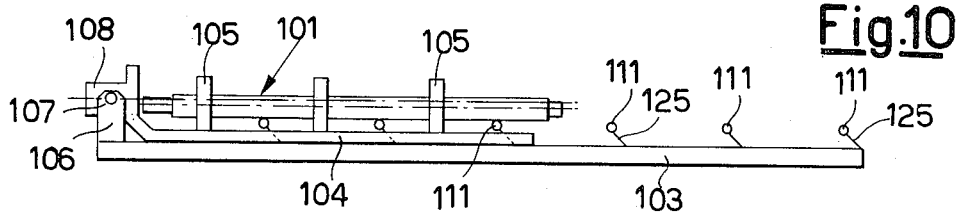

FIG. 10 shows the variable periphery implementation as it is being slid on the roller set and is passed through the open self-centering bearings until reaching a point near the centering head.

Figure 11:
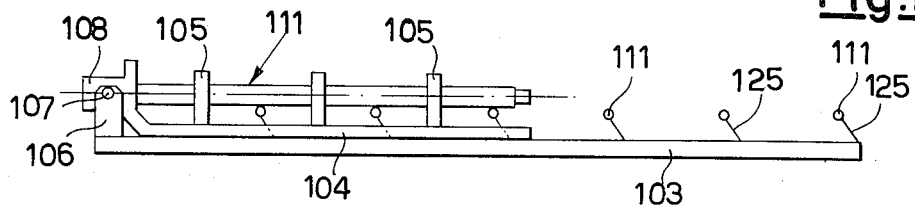

FIG. 11 shows how the rollers are lifted to the level which is required for introducing the end of the variable periphery implementation into the centering head: the end of the variable periphery implementation is introduced in the centering head and latched therein.

Figure 12:
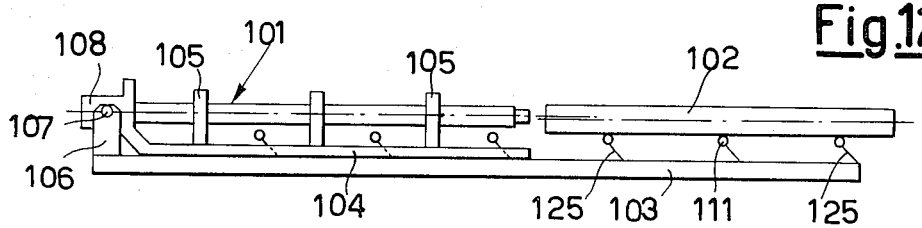

FIG. 12 shows the rollers as they are depressed to receive the preselected tubular article, which is laid thereon externally of the self-centering supporting members: the variable periphery implementation is overhangingly sustained by the centering head.

Figure 13:
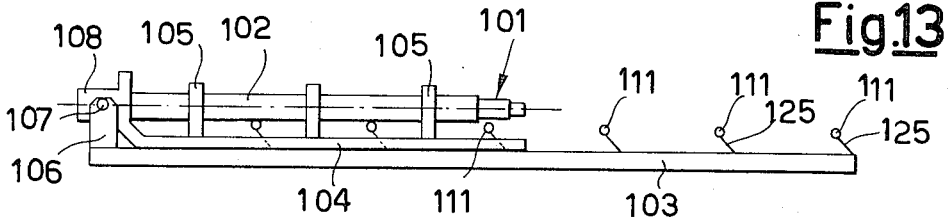

FIG. 13 shows the rollers as they are lifted to the position which is appropriate for allowing the tubular article to slide thereon and enter the variable periphery implementation.

FIG. 14 shows how the free end of the variable periphery implementation is latched at the correct level (by the linkage 110), the self-centering bearings being clamped around the tubular article, whereafter the rollers are depressed and the tubular article is latched between the centering head 108 on the one side, and a sealing ring 136 on the opposite side, by means of screw stays 137.

FIG. 15 shows how the swingable cradle 104 is tilted upwards for the correct filling of the gap 138, existing between the variable periphery implementation and the tubular article, with the material intended to provide the inner lining therefor. Such a tilt, in fact, permits the complete venting of air from the gap 138 as the filling material is introduced therein, so that no undesirable air pips are formed in the finished lining. Filling the gap takes place through holes formed through the head of the implementation as outlined above in connection with the machine shown in FIGS. 1 to 3.

FIG. 16 shows how the swingable cradle 104 is restored to its normal position when waiting for the setting of the coating material.

FIG. 17 shows how the free end of the variable periphery implementation is set free and the sealing ring at the end of the lined tubular article is withdrawn.

FIG. 18 shows how the rollers are lifted until contacting the tubular article, the self-centering bearings are widened and the tubular article with its lining is slid until being wholly away from the self-centering bearings.

Finally, FIG. 19 shows how the lined tubular article is withdrawn and the machine is in the same position as seen initially in FIG. 10 and is ready to receive another tubular article to be lined, equal to the previous one, or, as an alternative, the machine is ready for the change of the variable periphery implementation if it is desired to line a tubular article having a cross-sectional size which is such as to require the change of the variable periphery implementation.

While a few embodiments of the invention have been shown and described herein, it will be understood that modifications and changes can be introduced therein without departing from the scope of this invention as defined in and by the appended claims.

I claim:

1. A self-centering machine for applying a lining to the inner wall of a tubular article characterized in that it comprises, in combination: a uniformly variable diameter tubular implementation, a fixed bedplate having a leveladjustable roller set, a cradle mounted oscillably on said bedplate and carrying, in correspondence with the axis of oscillation, a centering head adapted to receive either end of said uniformly variable diameter tubular implementation, and having along said cradle a plurality of self-centering bearings for the tube to be lined, adjusting means acting between the swingable cradle and the implementation and adapted to have the longitudinal central axis of the implementation coinciding with the axis of the self-centering bearings, actuating means being provided for adjusting the level of the roller set, to control the oscillation of the cradle and the action of the self-centering bearings, so that one end of the variable diameter implementation is introducable in the centering head of the swingable cradle when the selfcentering bearings are open and by having the implementation slidable on the roller set placed at a certain level, the tube to be lined of one length being insertable over the implementation by sliding such tube on the roller set now arranged at a lower level than before, centered on the respective self-centering bearings which are closable thereon and latched between the centering head on the one side and on a sealing ring on the other side, said implementation comprising in combination an expansible sheath or jacket of a longer length than said tube in the interior of which are provided expanding means, the cradle being tiltable upwards to permit the introduction of the coating material in the gap formed between the implementation and the tube.

2. An implementation according to claim 1, characterized in that said expanding means are comprised of a plurality of radial sectors which by being extended out of a central spindle support the elasic sheath and have inclined planes on which are active pushers carried by rods slidable relative to said spindle in a positionally adjustable manner.

3. An implementation according to claim 2, characterized in that the adjoining sectors of said plurality of sectors have the overlapping edges slidable on each other.

4. An implementation according to claim 2, characterized in that the sliding of said rods is controlled by a screw-and-nut mechanism.

5. An implementation according to claim 2, characterized in that said sectors cooperate with air bags acting between the sectors and the central spindle.

6. A machine according to claim 1, characterized in that the centering head is cylindrical.

7. A machine according to claim 1, characterized in that said self-centering bearings are of the kind having a leaf diaphragm type opening and closing mechanism.

8. A machine according to claim 1, characterized in that said adjustment means are formed by a telescopable rod with screw and nut mechanism.

9. A machine according to claim 1, characterized in that the actuating means adapted to adjust the level of the roller set are formed by a motive means adapted to shift a rod which is operatively connected to linkages carrying the rollers of the roller set.

10. A machine according to claim 1, characterized in that the actuating means adapted to control the oscillation of the cradle are composed of a jack mechanism.

* * * * *

UNITED STATES PATENT AND TRADEMARK OFFICE
CERTIFICATE OF CORRECTION

PATENT NO. : 4,240,775
DATED : December 23, 1980
INVENTOR(S) : Alberto BERNI

It is certified that error appears in the above-identified patent and that said Letters Patent are hereby corrected as shown below:

Col. 1, line 39, correct the spelling of -- has --.

Col. 2, line 20, correct the spelling of -- characterized --.

Col. 2, line 28, delete "said".

Col. 3, line 43, delete "de-formation" and insert -- deformation

Col. 4, line 56, delete "11" and insert -- 111 --.

Signed and Sealed this

Twelfth Day of May 1981

[SEAL]

Attest:

RENE D. TEGTMEYER

*Attesting Officer*   *Acting Commissioner of Patents and Trademarks*